US012503914B2

(12) United States Patent
Maxfield et al.

(10) Patent No.: US 12,503,914 B2
(45) Date of Patent: Dec. 23, 2025

(54) LADDERS AND HINGE FOR LADDERS

(71) Applicant: LITTLE GIANT LADDER SYSTEMS, LLC, Springville, UT (US)

(72) Inventors: B. Scott Maxfield, Mapleton, UT (US); N. Ryan Moss, Mapleton, UT (US)

(73) Assignee: LITTLE GIANT LADDER SYSTEMS, LLC, Springville, UT (US)

(*) Notice: Subject to any disclaimer, the term of this patent is extended or adjusted under 35 U.S.C. 154(b) by 1345 days.

(21) Appl. No.: 17/180,156

(22) Filed: Feb. 19, 2021

(65) Prior Publication Data

US 2021/0262288 A1 Aug. 26, 2021

Related U.S. Application Data

(60) Provisional application No. 62/979,243, filed on Feb. 20, 2020.

(51) Int. Cl.
*E06C 7/50* (2006.01)
*E06C 1/32* (2006.01)

(52) U.S. Cl.
CPC . *E06C 7/50* (2013.01); *E06C 1/32* (2013.01)

(58) Field of Classification Search
CPC ... E06C 1/18; E06C 1/32; E06C 1/397; E06C 7/50; E05D 11/1064; F16C 11/10
See application file for complete search history.

(56) References Cited

U.S. PATENT DOCUMENTS

| | | | | | |
|---|---|---|---|---|---|
| 1,207,552 | A * | 12/1916 | Hill | E06C 1/32 182/27 | |
| 1,529,898 | A * | 3/1925 | Lucke | E06C 1/39 182/105 | |
| 3,879,146 | A * | 4/1975 | Mayer | E05D 11/081 403/93 | |

(Continued)

FOREIGN PATENT DOCUMENTS

| | | | |
|---|---|---|---|
| CN | 103470178 | A | 12/2013 |
| DE | 6603088 | U | 9/1969 |

(Continued)

OTHER PUBLICATIONS

International Search Report and Written Opinion of International Application No. PCT/US2021/018771, mailed Apr. 27, 2021.

(Continued)

*Primary Examiner* — Colleen M Chavchavadze
(74) *Attorney, Agent, or Firm* — Dorsey & Whitney, LLP

(57) ABSTRACT

Ladders and ladder components are described herein, including multipurpose and adjustable ladders. In one embodiment, a ladder includes a first assembly having rails and rungs, a second assembly having rails and rungs, and one or more hinges coupling the first and second assemblies together such that the first and second assembly may be positioned relative to one another in at least a position or state and at least a second position or state. The ladder is adjustable by moving a pin from a locked state in which it is located in a recess or slot of the hinges and prevents (Continued)

rotation of the hinges to an unlocked state in which it is removed from the recess or slot. Multiple joints can be simultaneously transitioned between locked and unlocked states using a releaser to move the pin, and a spring can bias the pin into a locked state.

6 Claims, 13 Drawing Sheets

(56) References Cited

U.S. PATENT DOCUMENTS

| | | | | | |
|---|---|---|---|---|---|
| 4,540,306 | A * | 9/1985 | Wang | E06C 1/32 16/334 |
| 4,543,006 | A * | 9/1985 | Wang | E06C 1/32 16/334 |
| 4,577,986 | A * | 3/1986 | Wang | E06C 1/32 16/349 |
| 4,643,274 | A * | 2/1987 | Tataseo | E06C 7/48 182/129 |
| 4,645,371 | A * | 2/1987 | Wang | F16C 11/10 182/163 |
| 4,911,263 | A * | 3/1990 | Kuperman | E06C 1/397 182/16 |
| 4,928,792 | A | 5/1990 | Krause | |
| 5,026,198 | A * | 6/1991 | Lin | E06C 1/32 182/163 |
| 9,016,434 | B2 | 4/2015 | Moss et al. | |
| 9,580,959 | B2 | 2/2017 | Kieffer et al. | |
| 10,487,576 | B2 | 11/2019 | Ballard et al. | |
| D885,607 | S | 5/2020 | Miner et al. | |
| 10,876,356 | B2 * | 12/2020 | Russell | E06C 1/16 |
| 2016/0153231 | A1 | 6/2016 | Kieffer et al. | |
| 2018/0347278 | A1 | 12/2018 | Russell et al. | |
| 2019/0376343 | A1 | 12/2019 | Maxfield et al. | |
| 2022/0341262 | A1 * | 10/2022 | Behm | E06C 7/06 |

FOREIGN PATENT DOCUMENTS

| | | | |
|---|---|---|---|
| DE | 2914476 | A1 | 10/1980 |
| DE | 3723037 | A1 | 1/1989 |
| DE | 3937535 | C1 | 3/1991 |
| EP | 0002549 | A1 | 6/1979 |
| KR | 200146389 | Y1 | 6/1999 |

OTHER PUBLICATIONS

EP21757056.3 Extended European Search Report dated Feb. 13, 2024 (6 pages).

Maxfield, B. S. "Flip-Up Ladder", U.S. Design U.S. Appl. No. 29/667,354, filed Oct. 19, 2018.

Maxfield, B. S. , "Ladder", Design U.S. Appl. No. 29/677,352, filed Oct. 19, 2018.

Maxfield, B. S. , "Ladder Accessory", Design U.S. Appl. No. 29/679,733, filed Feb. 8, 2019.

Maxfield, B. S. , "Top Cap for a Ladder", Design U.S. Appl. No. 29/679,726, filed Feb. 8, 2019.

Maxfield, B. S. , "Top Cap for Ladder", Design U.S. Appl. No. 29/667,356, filed Oct. 19, 2018.

First Office Action in China Patent Application No. 202180015618.3.

* cited by examiner

LADDERS AND HINGE FOR LADDERS

CROSS-REFERENCE TO RELATED APPLICATIONS

This application claims the benefit of U.S. Provisional Patent Application No. 62/979,243, filed on Feb. 20, 2020, the disclosure of which is incorporated by reference herein in its entirety.

BACKGROUND

The present invention relates generally to ladders including various embodiments of combination ladders, as well as various ladder components. Ladders are conventionally utilized to provide a user thereof with improved access to elevated locations that might otherwise be inaccessible. Ladders come in many shapes and sizes, such as straight ladders, straight extension ladders, step ladders, and combination step and extension ladders. So-called combination ladders may incorporate, in a single ladder, many of the benefits of multiple ladder designs.

Ladders known as step ladders, sometimes referred to as A-frame ladders, are self-supporting ladders, meaning that they do not need to be leaned against a wall, pole or other structure for stability. Rather, step ladders may be positioned on a floor (or other similar surface) such that at least three, and conventionally four, feet of the ladder provide a stable support structure for a user to climb upon, even in an open space (e.g., outside or in the middle of a room) without a wall, roof, pole or other type of structure being necessary for the stability of the ladder.

Ladders such as combination ladders are highly utilized by various tradespeople as well as homeowners. Such ladders are "self-supporting" in one configuration (e.g., in step ladder configuration) such that they do not need to have the upper end of the ladder to be positioned against a supporting structure (e.g., a wall or the edge of a roof). Rather, when in such a configuration, combination ladders conventionally utilize four feet, spaced from one another, to provide a stable structure and to support the ladder and a user when placed on, for example, a floor or the ground. This enables a user of the ladder to gain access to elevated areas even though the accessed area may be, for example, in the middle of a room, away from walls or other potential supporting structures that are conventionally required when using a straight ladder or an extension ladder.

Combination ladders may be placed in other configurations, including one wherein the ladder substantially extends in a single plane, such as a straight ladder or an extension ladder, providing access to increased height (as compared to when it is in the step ladder configuration) but typically requiring some elevated structure to support the ladder (e.g., a wall or the edge of a roof).

For these reasons and others, combination ladders have become a popular form of ladders and comprise a substantial segment of the ladder market. However, there are always areas of potential improvement.

SUMMARY

The present invention is directed to ladders, hinge assemblies for ladders and related methods. In accordance with certain embodiments, a hinge assembly is provided that enables the unlocking of two, spaced apart joints, by actuating a releaser mechanism in a direction either toward or away from an adjacent rung.

In one embodiment, a ladder is provided that includes a first assembly, a second assembly and a hinge assembly joining the first and second assemblies. The hinge assembly includes a first mounting portion, a second mounting portion pivotable relative to the first mounting portion about an axis of rotation, the second mounting portion having a slot, and a pin movable from a first position in the slot to a second position out of the slot, wherein the pin moves radially between the first and second positions relative to the axis of rotation.

In one embodiment, the pin moves radially along a radial axis that intersects the axis of rotation.

In one embodiment, the hinge assembly further comprises a releaser pivotally coupled with the first mounting portion and configured to displace the pin from the first position to the second position when pivoted relative to the first mounting portion.

In one embodiment, the first mounting portion is coupled with the first assembly, the second mounting portion is coupled to the second assembly, and wherein the first assembly includes a pair of rails and a rung extending between and coupled to the rails, wherein a handle portion of the releaser is configured for displacement toward the rung when displacing the pin from the first position to the second position.

In one embodiment, the axis of rotation is a first axis of rotation, wherein releaser pivots about a second axis of rotation, the second axis of rotation being parallel to the first axis of rotation.

In one embodiment, a biasing member positioned and configured to bias the pin into the slot. In one particular embodiment, the biasing member is coupled with the pin. In another embodiment, the biasing member is coupled to the rung.

In one embodiment, the mounting portion has a second slot and a third slot, the second and third slots each being selectively engageable by the pin upon rotation of the first mounting portion relative to the second mounting portion.

In one embodiment, the first mounting portion includes an elongated slot and the pin is positioned within and traverses a length of the elongated slot when the pin is displaced from the first position to the second position.

In one embodiment, a retaining member is positioned and configured to prevent the pin from being displaced out of the elongated slot in a direction that is parallel to the axis of rotation.

In one embodiment, the retaining member includes an interference feature positioned adjacent an end of the pin.

In one embodiment, a guard is positioned about the pin.

In accordance with another embodiment, another ladder is provided that includes a first assembly having a first pair of rails and at least one rung positioned between, and coupled to, the first pair of rungs; a second assembly having a second pair of rails; a hinge assembly joining the first and second assemblies, the hinge assembly including a pair of spaced apart joints. Each joint includes a first mounting portion, and a second mounting portion pivotable relative to the first mounting portion about an axis of rotation, the second mounting portion having a slot. The hinge assembly further includes a pin extending between each of the spaced apart joints, the pin being movable from a first position in the slot of each second mounting portion to a second position out of the slot of each mounting portion, wherein the pin moves toward the rung of the first assembly when displaced to the second position.

In one embodiment, a releaser is rotatably attached to the first mounting portion and configured to apply a force to the pin to move the pin from the first position to the second position.

In one embodiment, the axis of rotation is a first axis of rotation, wherein releaser pivots about a second axis of rotation, the second axis of rotation being parallel to the first axis of rotation.

In one embodiment, a biasing member is positioned and configured to bias the pin into the slot and wherein the biasing member is coupled with the pin.

In one embodiment, a biasing member is positioned and configured to bias the pin into the slot and wherein the biasing member is coupled to the at least one rung.

In accordance with another embodiment, a method of adjusting a ladder is provided. The method includes unlocking a first assembly of the ladder relative to a second assembly of the ladder by simultaneously translating a pin out of a first slot in a first joint joining the first and second assemblies and translating the pin out of a second slot in a second joint joining the first and second assemblies, and rotating the first assembly relative to the second assembly about the first and second joints.

In one embodiment, translating the pin out of each of the first and second slots includes moving a releaser horizontally toward a rung of the first assembly.

BRIEF DESCRIPTION OF THE DRAWINGS

The foregoing and other advantages of the invention will become apparent upon reading the following detailed description and upon reference to the drawings in which.

DETAILED DESCRIPTION

Various embodiments of ladders and ladder components are described herein. The described embodiments are not mutually exclusive of each other. Rather, various features, components or elements of one described embodiment may be used in conjunction with features, components or elements of other described embodiments.

Figure 1:
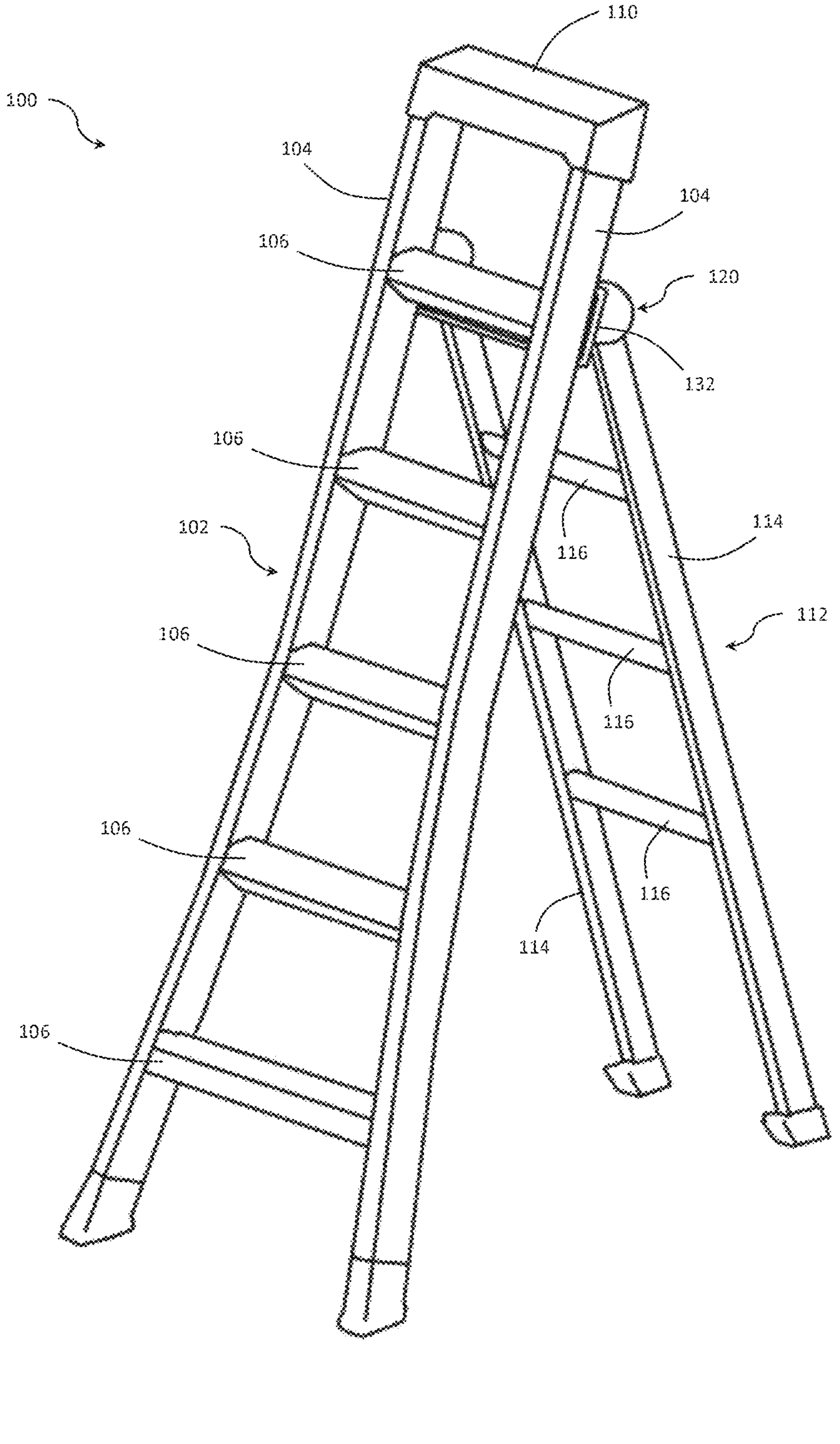
FIG. 1 is a perspective view of a ladder according to an embodiment of the present disclosure, with the ladder in a first state or configuration.
Figure 2:
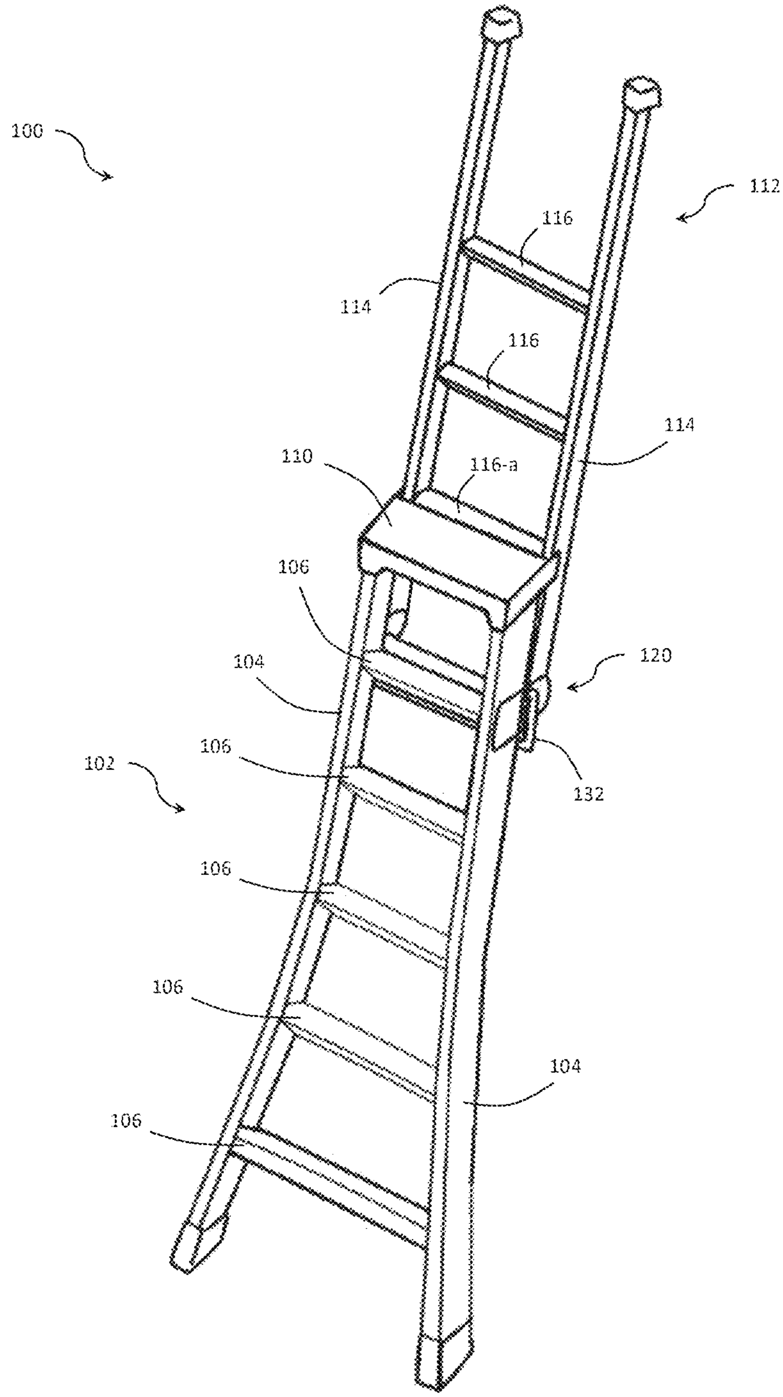
FIG. 2 is a perspective view of the ladder shown in FIG. 1 while in a second state or configuration.
Figure 3:
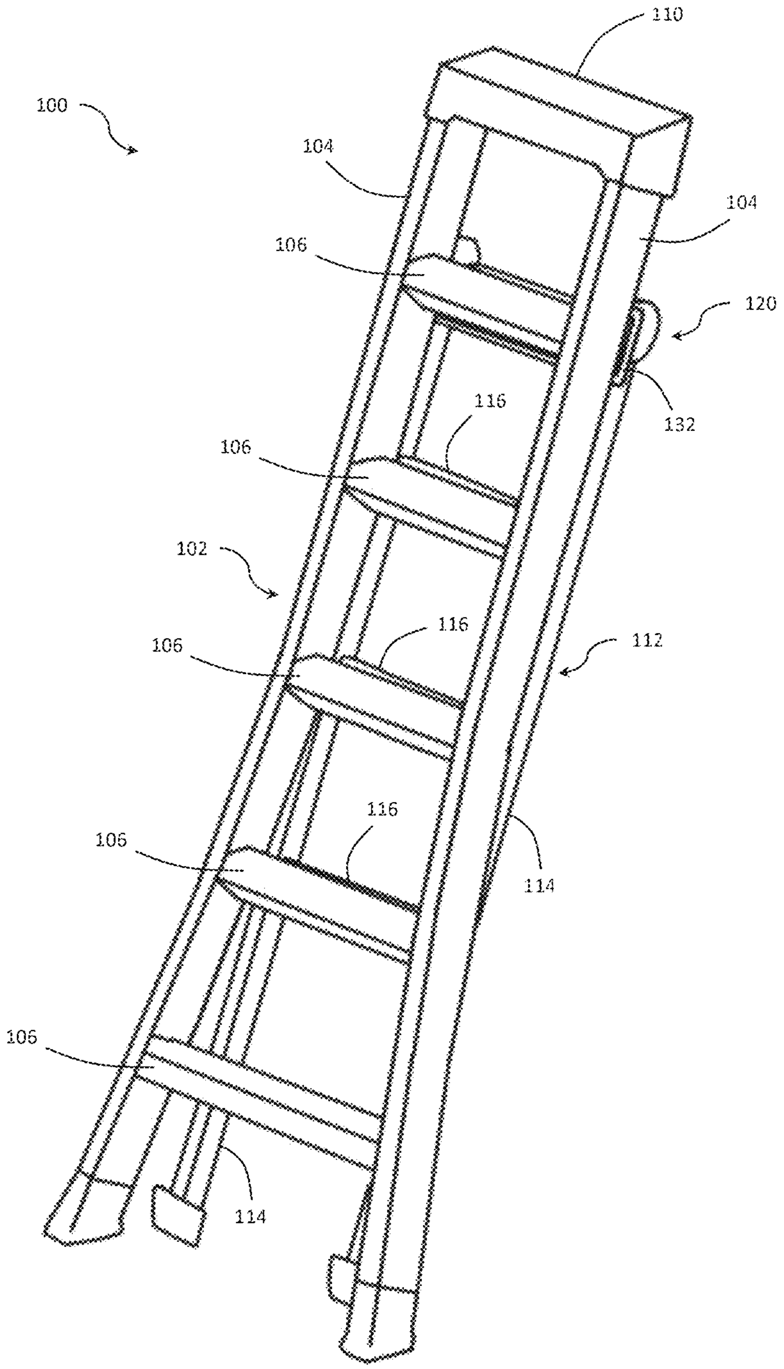
FIG. 3, is a perspective view of the ladder shown in FIG. 1 while in a third state or configuration.

Referring to FIGS. 1-3 a ladder 100 is shown in accordance with an embodiment of the present disclosure. The ladder 100 includes a first assembly 102 (i.e., front assembly) having a pair of spaced apart rails 104 and a plurality of rungs 106 extending between and coupled to the rails 104. For purposes of convenience, the rungs 106 and rails 104 of the first assembly 102 may be referred to herein as “front rungs 106” or “front rails 104” respectively.

The front rungs 106 are spaced apart, substantially parallel to one another, and are configured to be substantially level when the ladder 100 is in an orientation of intended use so that the rungs 106 may be used as “steps” for a user to ascend the ladder 100 as will be appreciated by those of ordinary skill in the art. In various embodiments, the upper surface of the rungs 106 may include traction features (e.g., grooves and ridges, grip tape or other anti-slip features) to provide traction to a user while standing on the rungs 106. A top cap 110 may be coupled with the upper portions of the front rails 104 and configured to support the weight of a user in the event that a user stands on the top cap 110. The upper surface of the top cap 110 may also include traction or anti-slip features to provide traction to a user while standing thereon.

The ladder 100 also includes a second assembly 112 (i.e., rear assembly) having a pair of spaced apart rails 114. A plurality of rungs 116 extend between and are coupled to the spaced apart rails 114. For purposes of convenience, the rungs 116 and rails 114 of the second assembly may be referred to herein as “rear rungs 116” and “rear rails 114” respectively. It is noted that the use of the terms “front” and “rear” herein is not to be considered limiting although describing relative positions of the components when the ladder 100 is in a step ladder configuration. Rather, use of “front” and “rear” is for purposes of convenience and clarity in describing various components or assemblies of the embodiments of the present disclosure.

The rear rungs 116 are spaced apart, substantially parallel to one another, and are configured to be substantially level when the ladder 100 is in an orientation for intended use so that the rear rungs 116 may be used as “steps” for a user to ascend the ladder 100. In various embodiments, the upper surface (considering the orientation of the ladder as viewed in FIG. 1) of the rear rungs 116 may include traction features (e.g., grooves and ridges, grip tape or other anti-slip features) to provide traction to a user while standing on the rear rungs 116. Additionally, or alternatively, in some embodiments, the rear rungs 116 may include traction features or anti-slip features formed the lower surface thereof (again, as viewed in FIG. 1).

The second assembly 112 is pivotally coupled with the first assembly 102 via a hinge assembly 120 (sometimes referred to as the “hinge” herein for purposes of brevity). In the embodiment shown, the hinge 120 is spaced downward and away from the top cap 110 along the length of the front rails 104 of the first assembly 102. For example, the hinge 120 may be positioned adjacent the rung 106 that is closest to the top cap 110. In one embodiment, this may be approximately 12 inches from the top of the first assembly 102. The hinge 120 may be configured to selectively lock the first assembly 102 and the second assembly 112 in one or more desired positions relative to each other. Thus, for example, in FIG. 1, the first and second assemblies 102, 112 are locked such that the rear rails 114 extend at an acute angle relative to the front rails 104, placing the ladder in a self-supported step ladder configuration (i.e., a flat-support-standing or inverted “V” configuration). In some embodiments, the hinge assembly 120 can be used in other types of ladders such as, for example, articulating ladders.

It is noted that, in some embodiments, the ladder 100 does not include any spreader mechanisms (e.g., hinged, folding braces or other structures that extend between the first and second assemblies) that are conventionally used to accommodate the folding of the ladder as well as the "locking" of the first and second assemblies 102 and 112 relative to each other in a step ladder configuration. Instead, in various embodiments of the present disclosure, the locking of the hinge 120 maintains the desired positioning of the first and second assemblies 102 and 112 in a deployed, step ladder configuration as shown in FIG. 1.

As seen in FIGS. 2 and 3, the hinge 120 can also enable the second assembly 112 to selectively rotate relative to the first assembly 102 such that the rear rails 114 may be positioned to extend at an angle of substantially 180 degrees (FIG. 2) or zero degrees (FIG. 3) from the front rails 104. Stated another way, the front rails 104 and rear rails 114 can be configured extend from each other in a generally parallel manner (i.e., in parallel planes), and in some cases, a significant portion of the second assembly 112 can extend upwards and beyond the top cap 110. The hinge 120 may also be configured to lock the first and second assemblies 102 and 112 in the relative positions shown in FIGS. 2 and 3, such as in a storage configuration (FIG. 3) or a straight ladder configuration (FIG. 2) that enables a user to reach extended heights (beyond that of the step ladder configuration of FIG. 1) when the ladder 100 is leaned against an appropriate support surface (e.g., a wall or the edge of a roof).

With the second assembly 112 "flipped up" into a position that places the ladder 100 in a straight ladder configuration (e.g., FIG. 2), one of the rear rungs 116-*a* may align with the upper surface of the top cap 110, providing an extended support surface (i.e., the combined surface areas of the upper surface of the top cap 110 and the tread surface of the adjacent rung 116-*a*) on which a user may stand. Additionally, the other rungs 116 of the second assembly 112 can be spaced similarly to the rungs 106 of the first assembly 102 so that a user may continue to climb from the rungs 106 of the first assembly 102, onto the top cap 110, and on to the rungs 116 of the second assembly 112 in a continuous and uninterrupted manner, and without a change in spacing from one step to another, as the user ascends and descends the ladder 100.

The hinge 120 may be configured to lock and thereby prevent rotation of the second assembly 112 relative to the first assembly 102 when in the position shown in FIG. 2, thereby providing structural rigidity between the two assemblies 102 and 112. Additionally, the rear rails 114 may each abut a back surface of the top cap 110 such that force (e.g., from a user climbing the ladder 100) can be transferred through the first assembly 102, via the top cap 110, to the rear rails 114. In addition to the transfer of this type of force, it is noted that lateral forces (e.g., forces extending in a direction along an axis that passes through both front rails 104) may also be distributed through the top cap 110, through the sidewalls of channels in the back surface of the top cap 110 that are configured to receive the rear rails 114 (or through similar or other abutment surfaces associated with the top cap 110 or front rails 104) or vice versa, and in combination with the connections provided by the hinge 120, again providing significant strength and stability to the ladder 100 when in the configuration shown in FIG. 2.

Referring to FIG. 3, the second assembly 112 may be selectively positioned, relative to the first assembly, in a storage configuration or leaning configuration, wherein the rear rails 114 are placed adjacent to, and extend substantially parallel to, the front rails 104. In this configuration, no portion of the second assembly 112 extends upward beyond the top cap 110 (or otherwise contacts the top cap 110) as compared to the straight ladder configuration of FIG. 2. In this configuration, the ladder 100 may be stored in relatively compact space, or it may be used to lean up against a supporting surface or an object (e.g., a wall or a pole) to place the user closer to the supporting surface.

The first and second assemblies 102 and 112 may be formed of a variety of materials and using a variety of manufacturing techniques. For example, in one embodiment, the front and rear rails 104 and 114 may be formed of a composite material, such as fiberglass, while the rungs 106 and 116 and other structural components may be formed of aluminum or an aluminum alloy. In some embodiments, the top cap 110 may be formed of a rigid metal or plastic material and may be molded. In other embodiments, the assemblies 102 and 112 (and their various components) may be formed of a variety of other materials including, for example, other composites, plastics, polymers, metals, and metal alloys.

In some embodiments, the front rails 104 may be tapered, angled or curved such that the lowermost portions of the two front rails 104 are spaced further from one another than the uppermost portions of the two front rails 104. In some embodiments, the front rails 104 can have a curved geometry in at least a lower portion of the rails that causes them to bend outward at their base ends. This may be the case even in embodiments where the rails 104 are formed of composite materials such as, for example, fiberglass. The curved portion of the front rails 104 at their lower ends can provide a widened base to increase the lateral stability of the ladder 100. Additionally, the straight portions, or parallel sections, at the upper ends of the front rails 104 enable the hinge 120 to be assembled to two parallel components, preventing binding of the hinge 120 when the second assembly 112 transitions between its various positions or states.

In other embodiments, the first and/or second assemblies 102 and 112 may each include rails that are straight and parallel to each other; straight and flared (e.g., the lower portions of the rails exhibiting a greater distance from each other than the upper portions of the rails); bent with an angular change; bent with a curved portion; or some combination of the above.

The ladder 100 may include a variety of other features or components, or may exhibit other types of constructions, including those shown or set forth in U.S. patent application Ser. No. 29/679,726, filed on Feb. 8, 2019, U.S. patent application Ser. No. 29/679,733, filed Feb. 8, 2019, U.S. patent application Ser. No. 29/677,352, filed Oct. 19, 2018, U.S. patent application Ser. No. 29/667,354, filed Oct. 19, 2018, U.S. patent application Ser. No. 29/667,356, filed Oct. 19, 2018, U.S. patent application Ser. No. 29/667,357, filed Oct. 19, 2018, and U.S. patent application Ser. No. 16/435,232, filed Jun. 7, 2019, the disclosures of which are incorporated by reference herein in their entireties.

Figure 4:
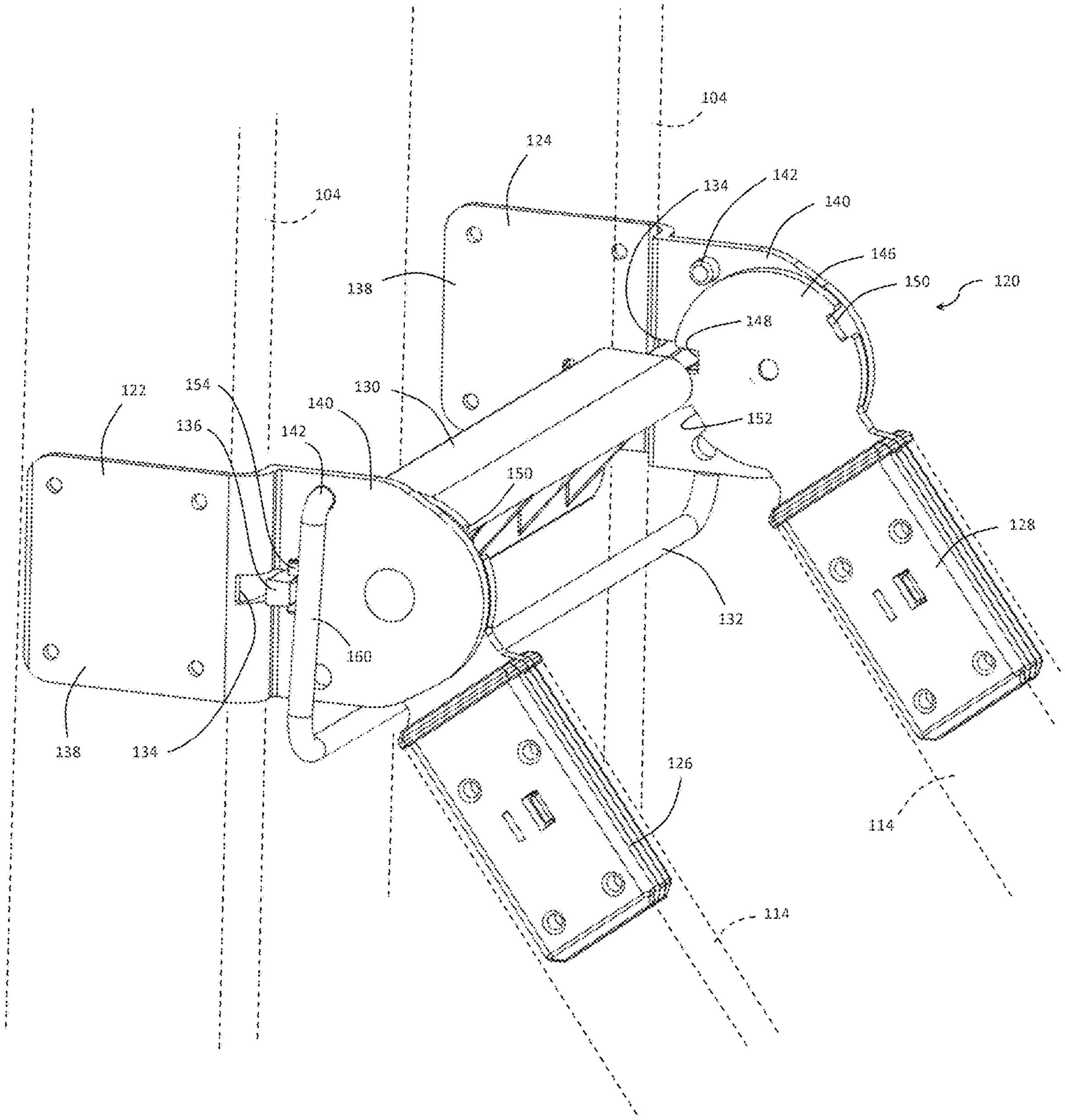
FIG. 4 is a rear perspective view of a hinge assembly according to an embodiment of the present disclosure.
Figure 5:
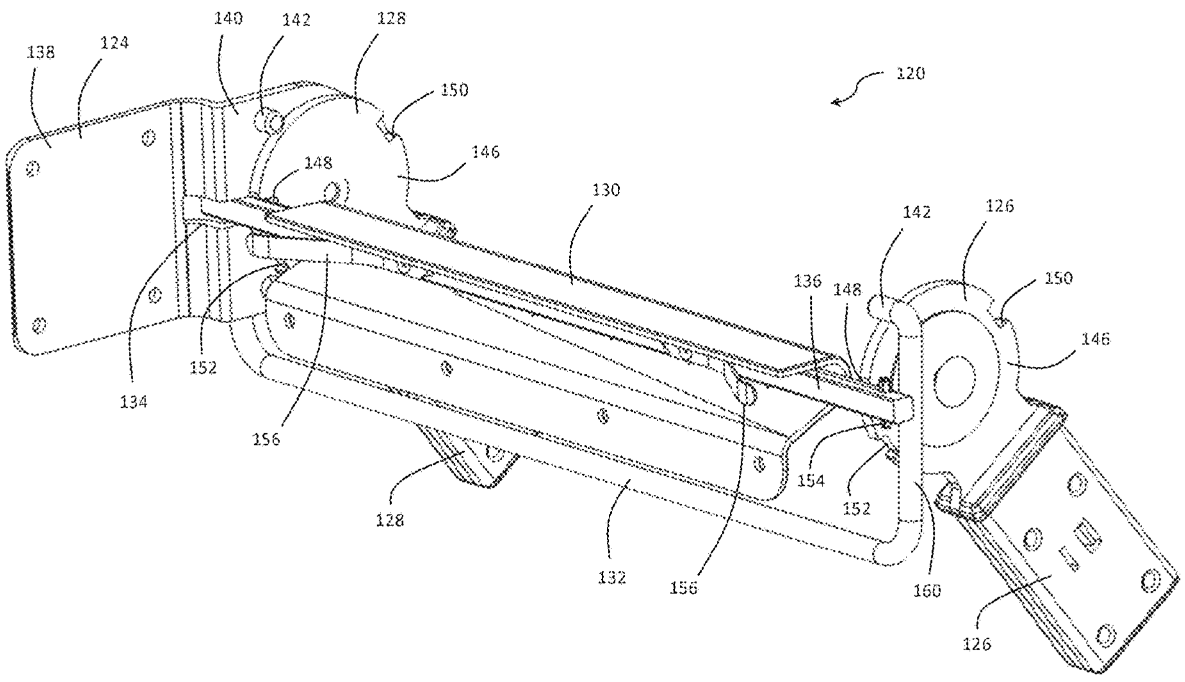
FIG. 5 is a front perspective view of the hinge assembly shown in FIG. 4.
Figure 6:
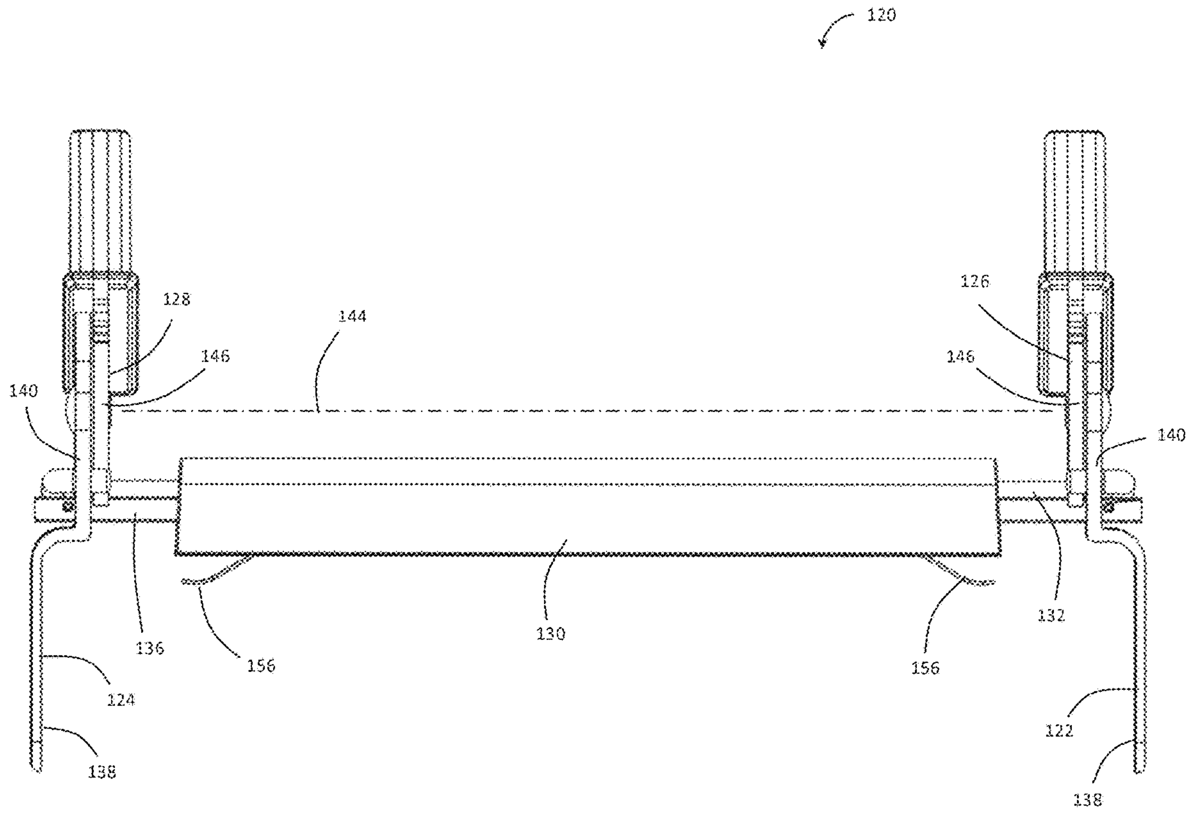
FIG. 6 is a top view of the hinge assembly shown in FIG. 4.
Figure 7:
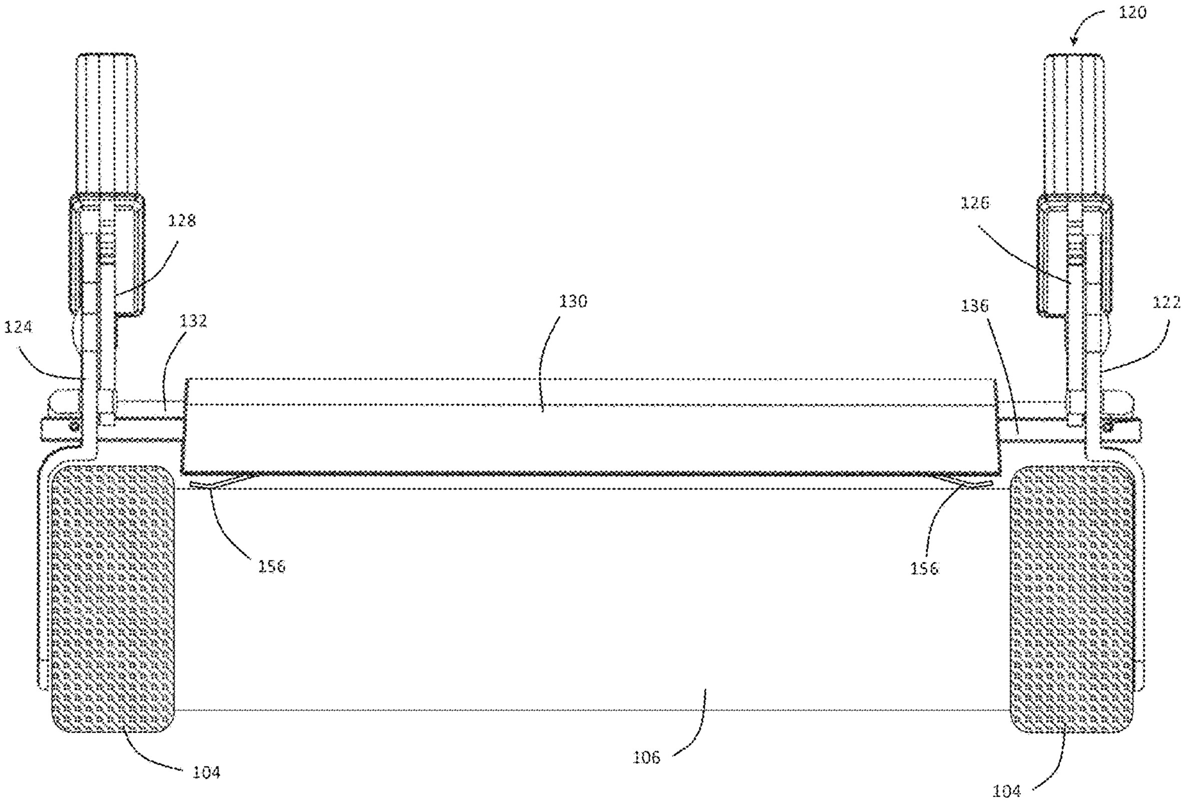
FIG. 7 is a top view of the hinge assembly shown in FIG. 4 when assembled to a portion of a ladder.
Figure 8:
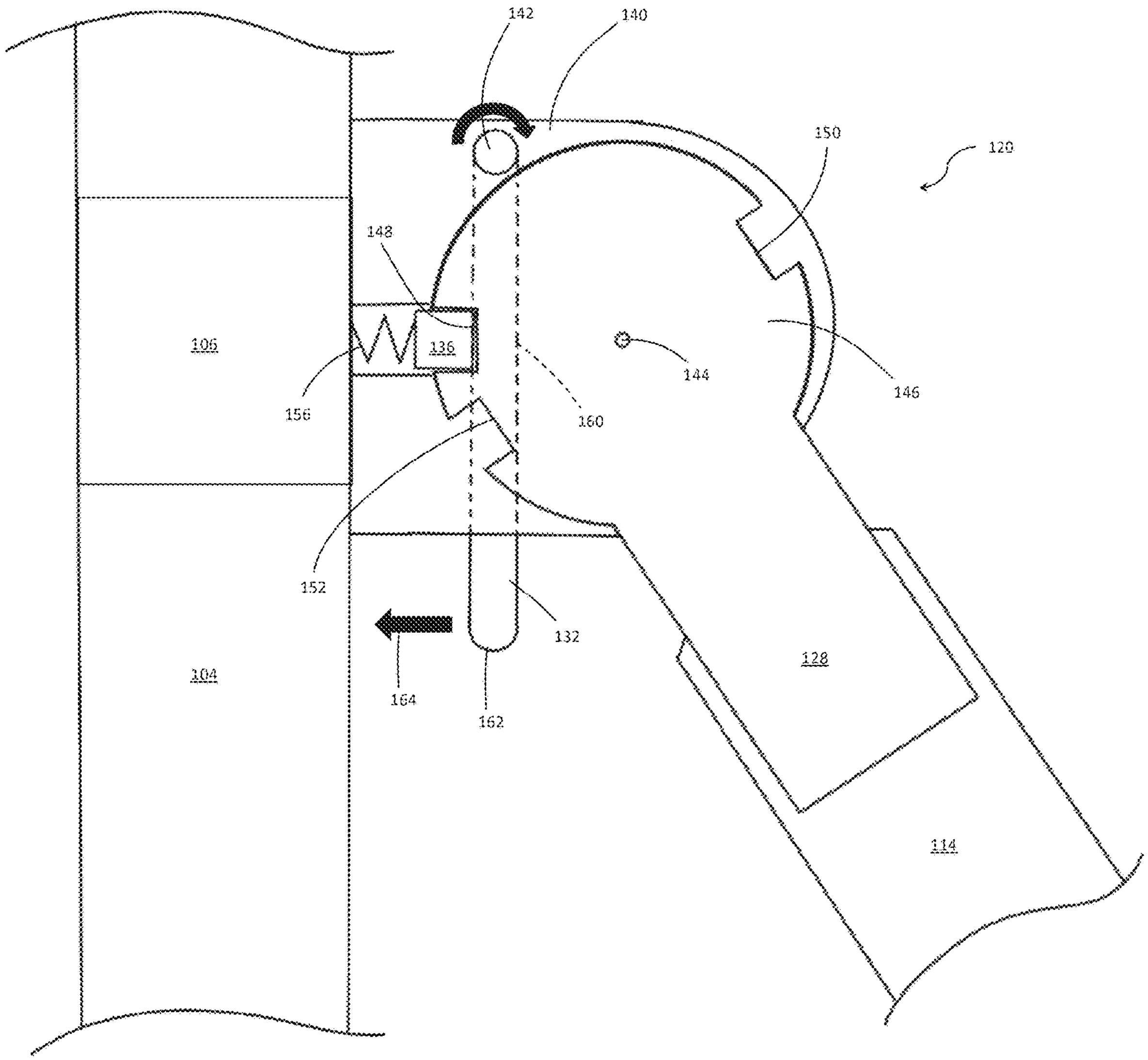
FIGS. 8-10 are schematic side views of a hinge assembly according to an embodiment of the present disclosure.
Figure 9:
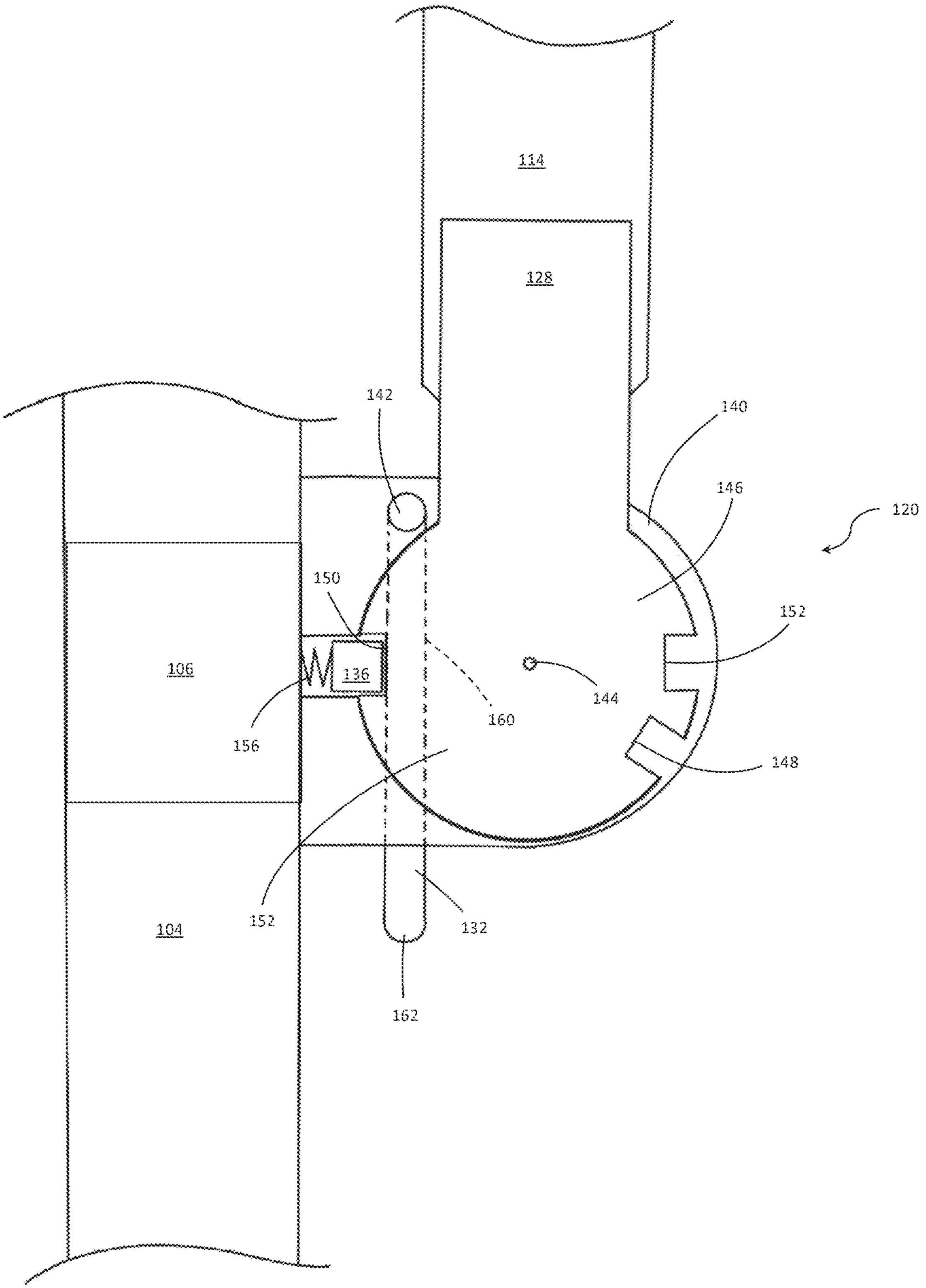
Figure 10:
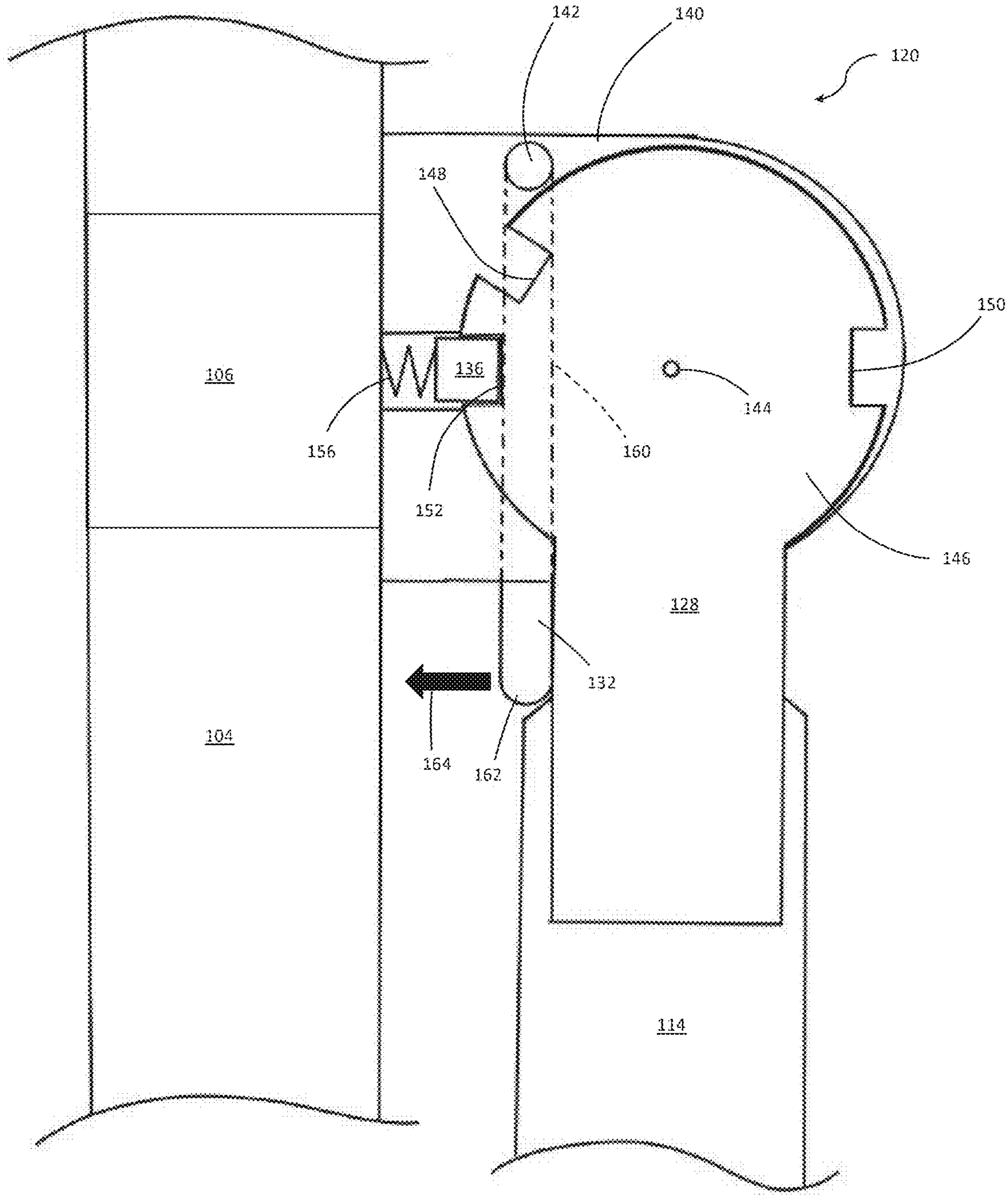
Figure 11:
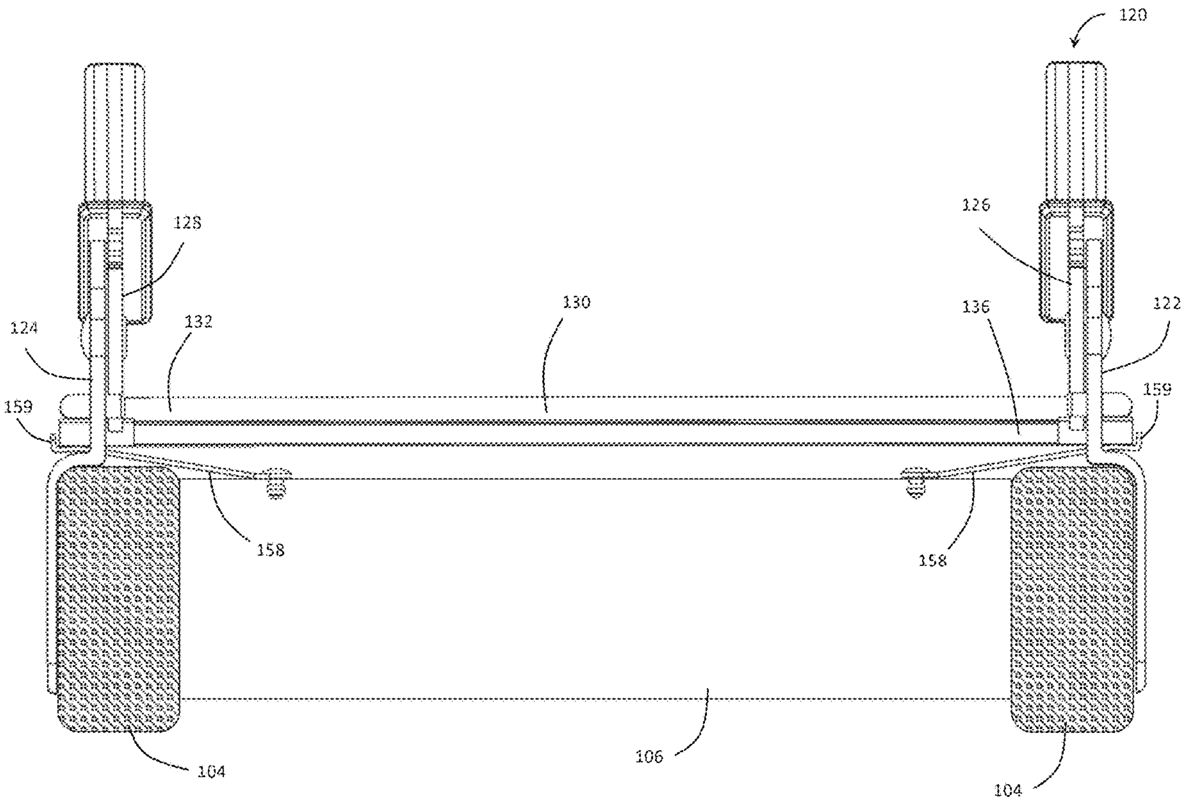
FIG. 11 is a top view of a hinge assembly according to an embodiment of the present disclosure.

Referring now to FIGS. 4-11, aspects of the hinge assembly 120 are shown. FIG. 4 shows a rear perspective view with rails 104, 114 shown in broken lines to improve visibility of features of the hinge 120. FIG. 5 shows a partial front perspective view of the hinge 120, FIGS. 6 and 7 show top views, and FIGS. 8-10 show diagrammatic side views. FIG. 11 is a partial section top view of an alternative embodiment of the ladder at the hinge 120 having a different spring configuration.

The hinge assembly 120 can include a pair of front mounting portions 122, 124 (i.e., first mounting portions) configured to attach to the front rails 104 of the first assembly 102. In FIG. 5, one front mounting portion 122 is omitted to show the parts positioned behind it. The hinge assembly 120 can also include a pair of rear mounting portions 126, 128 (i.e., second mounting portions) pivotally mounted to the first and second mounting portions 122, 124 and to the rear rails 114. Accordingly, each set of front/rear mounting portions (e.g., portions 122 and 126 or portions 124 and 128) can be referred to as a joint of the hinge assembly 120. For example, front mounting portion 122 and rear mounting portion 126 can form a first joint, and front mounting portion 124 and rear mounting portion 128 can form a second joint. An adjustment guard 130 can extend between the mounting portions 122, 124, 126, 128 and can be mounted to a top or side surface of a rung 106 extending between the front rails 104 near the hinge 120. A releaser 132 can extend between and can be pivotally coupled to the front mounting portions 122, 124. The front mounting portions 122, 124 can each have a slot 134 in which a pin 136 is slidably mounted.

The pair of front mounting portions 122, 124 can each comprise a front plate portion 138 and a rear plate portion 140. The slot 134 in each front mounting portion 122, 124 can be positioned between the front and rear plate portions 138, 140 and can be configured to have an elongated length aligned substantially perpendicular to the front rails 104. The rear plate portions 140 can be coupled to pivotable end portions 142 of the releaser 132. The rear plate portions 140 can also be pivotally coupled to the rear mounting portions 126, 128 through a pivot axis 144 (which is different than, but may be substantially parallel to, the pivot axis of the pivotable end portions 142). See, e.g., FIGS. 6 and 8. The front plate portions 138 can be mounted to (e.g., welded to, fastened to, adhered to, riveted to, or similarly attached to) the front rails 104 of the ladder 100 or can be integrally formed with the front rails 104. In other words, in some embodiments, the front plate portions 138 can be the front rails 104 or a part of the front rails 104. The rear plate portions 140 can be integral with the front plate portions 138 and can therefore remain stationary relative to the front plate portions 138. Accordingly, the rear mounting portions 126, 128 can rotate relative to the front and rear plate portions 138, 140 about the rotation axis 144.

The front mounting portions 122, 124 can have a transition between the front and rear plate portions 138, 140 that causes the rear plate portions 140 to be positioned closer together than the front plate portions 138. See FIG. 6. The overall width of the hinge 120 at the lateral side surfaces (i.e., the left and right side surfaces facing away from the rear mounting portions 126, 128) of the rear plate portions 140 can therefore be less than the lateral width of the front rails 104. The narrowed width can allow the pin 136 and releaser 132 to extend laterally outward beyond the lateral width of the rear plate portions 140 without extending laterally further outward than the outward lateral sides of the front plate portions 138 or, in some cases, the lateral sides of the front rails 104. The narrowed rear plate portions 140 can help prevent the outer ends of the releaser 132 or pin 136 from protruding away from the rest of the width of the ladder 100 and can therefore help reduce the overall width of the ladder 100 and can help prevent damage or unwanted contact with the releaser 132 and pin 136.

As explained above, the pair of rear mounting portions 126, 128 can be pivotally mounted to the rear plate portions 140 of the front mounting portions 122, 124. The rear mounting portions 126, 128 can each comprise a slotted portion 146 having a set of slots 148, 150, 152 that correspond to the slots in the other rear mounting portion. The slotted portion 146 can be generally circular in geometry with the slots 148, 150, 152 formed in the curved profile or periphery. Each slot 148, 150, 152 can correspond to a different selectable relative position of the first assembly 102 and the second assembly 112. For example, when the first slots 148 are radially aligned with (relative to axis 144) and receive the pin 136, the ladder 100 can be locked into the self-supported step ladder configuration of FIG. 1. This can therefore be referred to as a locked configuration or a locked position. When the second slots 150 are radially aligned with and receive the pin 136, the ladder 100 can be locked into the straight ladder configuration of FIG. 2, and when the third slots 152 are radially aligned with and receive the pin 136, the ladder 100 can be locked into the collapsed configuration of FIG. 3. Each of these configurations can also be referred to as locked configurations or locked positions for the ladder. When the pin 136 is received into a corresponding pair of slots 148, 150, 152 of the slotted portions 146, the pin 136 can prevent rotation of the rear mounting portions 126, 128 relative to the front mounting portions 122, 124. See also FIGS. 8-10 and their related descriptions herein. When the pin 136 is removed from all of the slots 148, 150, 152, the ladder 100 can be referred to as being in an unlocked configuration, as explained in further detail below.

In various embodiments, the adjustment guard 130 is an optional component that can be attached to a rung 106 of the ladder 100 to cover the pin 136 and/or other moving components. In some embodiments, the adjustment guard 130 can be attached to another part of the ladder 100 that does not rotate relative to the pin 136, such as by being attached to the front mounting portions 122, 124, to the front rails 104, or to a front rung 106. The adjustment guard 130 can therefore beneficially reduce the chance that the pin 136 will inadvertently be moved by leaning the ladder 100 against a corner of a wall or by some other force from outside the adjustment guard 130 that is directed in a forward or vertical direction against the pin 136. Additionally, the adjustment guard may help to prevent or reduce the likelihood of pinched fingers, snagged clothing or other similar mishaps.

The releaser 132 can comprise a rod, pole, tube, or similar lever arm that is rotatable relative to the front mounting portions 122, 124. The releaser 132 can comprise end portions 142 that are rotatably received by the rear plate portions 140, and the releaser 132 can therefore be rotated about an axis of rotation that extends through the end portions 142 and may be parallel to, and offset from, the axis 144 of the rear mounting portions 126, 128. The releaser 132 is described in further detail below.

The slots 134 in the front mounting portions 122, 124 define a path of movement for each end of the pin 136. In the embodiment shown, the slots 134 extend perpendicular to the front rails 104 and have an elongated dimension radially aligned with the axis of rotation 144 of the second assembly 112. In other words, their lengths extend along axes that intersect the rotational axis 144. The slots 134 can have a profile shape that corresponds to the profile shape of the pin 136. For example, the slots 134 can have a rectangular profile to receive a rectangular (e.g., square) pin 136. In some embodiments, the slots 134 can have rounded ends to receive a rounded (e.g., circular) pin. In some embodiments, the front ends of the slots 134 can be positioned on the front mounting portions 122, 124 in a manner that ensures that the front ends are not obstructed by the rails 104 and so that the pin 136 can freely traverse the slots 134 without being prevented from moving due to contact with the rails 104. In some embodiments, the front rails 104 may serves as an abutment or a stop for the pin 136. The elongated horizontal length of each slot 134 can be sized to ensure that the pin 136 is fully removable from the slots 148, 150, 152 by the releaser 132 and while a torque is applied to the slotted portions 146 to cause them to rotate relative to the front mounting portions 122, 124, as explained in further detail below. In other words, the slots 134 can be large enough to receive the pin 136 while the pin 136 is not in any of the slots 148, 150, 152 and the ladder 100 is in an unlocked configuration.

The pin 136 can comprise a rod, tube, pole, shaft, or similar straight and rigid structure extending at least across the width of the rear mounting portions 126, 128. The pin 136 can extend through the slots 134 of the front mounting portions 122, 124 and can be selectively moved into and out of the slots 148, 150, 152 of the rear mounting portions 126, 128. The pin 136 can have an increased width section 154 or some other interference feature at each of its ends that can help prevent the pin 136 from moving along its major axis and thereby becoming dislodged from one or both slots 134. See FIGS. 4 and 5. The increased width sections 154 can comprise a cross-bar or secondary retaining pin that extends through or is attached to the end of the pin 136. Alternatively, another part (e.g., spring 158) can be configured to hold the pin 136 in place in the hinge 120. See FIG. 11.

The pin 136 can be connected to, or positioned against, at least one biasing member or spring 156. The spring 156 can therefore comprise a resilient member, a coil spring, a leaf spring, or similar flexible and elastically resilient structure. In some embodiments, the spring 156 can be an extension spring or a leaf spring that is mounted to the pin 136 and to the inner surface of the rear part of the adjustment guard 130. As shown in FIGS. 6 and 7, however, the spring 156 can face forward, i.e., facing the rung 106 adjacent to the pin 136. FIG. 6 shows the hinge 120 separated from the rung 106, thereby allowing the spring 156 to extend away from the pin 136 in a non-stressed or uncompressed manner. In FIG. 7, the spring 156 is compressed between the pin 136 and the rung 106, thereby biasing the pin 136 relative to the rung 106.

The spring 156 can press against the rung 106 and can therefore bias the pin 136 rearward in the slots 134 and toward the rotation axis 144. In this way, the spring 156 can bias the pin 136 against the slotted portions 146 of the rear mounting portions 126, 128. Thus, when the pin 136 is aligned with one of the slots 148, 150, 152, the spring 156 biases the pin 136 into the slots 148, 150, 152 with which the pin 136 is aligned (thereby biasing the hinge 120 into a locked configuration), and when the pin 136 is aligned with the curved outer surface of the slotted portions 146, the pin 136 engages the curved outer surface and the slotted portions 146 are able to rotate about the rotation axis 144 (thereby biasing the pin 136 to move into a locked position when the slotted portions 146 have slots 148, 150, 152 properly aligned with the pin 136). The spring 156 is shown diagrammatically in FIGS. 8-10.

In some embodiments, such as the embodiment shown in FIG. 11, one or more springs 158 can be fastened, mounted, or attached to the rung 106 (or some other part of the ladder) and can abut the pin 136 rather than vice versa. The springs 158 can thus bias the pin 136 away from the rung 106 in a manner similar to the embodiment of FIGS. 4-7. Additionally, the springs 158 can comprise a pin retainer 159 configured to abut and at least partially enclose the end of the pin 136 and thereby prevent the pin 136 from laterally (or axially) sliding out of the slots 134 due to mechanical interference with the pin retainer 159 (see, e.g., FIG. 11).

Referring to FIGS. 8-10, a set of diagrammatic side views of the hinge assembly 120 and related parts are shown. The proportions of certain parts in these figures may be exaggerated to help explain and illustrate their interactions with each other. As shown in FIG. 8, the pin 136 can be biased rearward toward the rotation axis 144 of the second assembly 112 by a spring 156. This can cause the pin 136 to be received in the first slots 148 of the rear mounting portions (e.g., 126, 128). As a result, the rear mounting portion 128 is prevented from rotating about the rotation axis 144 by the pin 136, and the ladder 100 and both joints in the hinge 120 are locked in the position shown in FIGS. 1 and 8.

As shown in at least FIGS. 4, 5, and 8, the releaser 132 can engage the rear side of the pin 136 between the rotation axis 144 and the pin 136. The releaser 132 can have one or more substantially vertically-extending side sections 160 configured to engage the pin 136 for this purpose. See FIG. 8. Due to the positioning of the side sections 160 and the axis of rotation of the end portions 142, rotation of the releaser 132 can cause a bottom section 162 of the releaser 132 to move forward (i.e., in the direction of arrow 164 in FIG. 8). This in turn applies a force to the pin 136 (via the side sections 160) that urges the pin 136 forward (i.e., radially away from the rotation axis 144 and toward a rung 106 of the first assembly) in a manner that overcomes the biasing force applied by the spring 156 and withdraws the pin 136 from the first slot 148. Accordingly, the releaser 132 can be referred to as an unlocking lever or pin mover. The bottom section 162 of the releaser 132 can be referred to as a handle or grip portion of the releaser 132 since a user can at least partially grasp and pull the bottom section 162 when unlocking the ladder 100. Application of a single force (e.g., pulling on the bottom section 162 in one direction) can simultaneously unlock both joints by simultaneously withdrawing both ends of the pin 136 from the slots 148.

When the pin 136 has been withdrawn from a slot (e.g., 148, 150, 152), the ladder 100 can be referred to as being in a rotatably, unlocked state. The pin 136 can simultaneously unlock both joints of the hinge assembly 120 by withdrawing from the slots in each joint simultaneously, and the pin 136 can lock both joints by entering corresponding slots in each joint simultaneously. While in the rotatably unlocked state, the second assembly 112 can rotate relative to the first assembly 102 from the position shown in FIG. 8 to a position shown in FIG. 9 or 10. Once rotation of the slotted portion 146 has begun and the pin 136 is no longer aligned with a slot 148, 150, 152, releasing an unlocking force on the releaser 132 (e.g., releasing the force directed in the direction of arrow 164) allows the pin 136 to be biased toward the rotation axis 144 by the spring 156. However, when the pin 136 is not aligned with a slot in the slotted portion 146, the pin 136 will merely engage the outer curved surface of the slotted portion 146 and not lock the slotted portion 146 in place. However, once the pin 136 is realigned with one of the slots (e.g., 150, as shown in FIG. 9), the pin 136 is biased by the spring 156 into the aligned slot and the ladder 100 is automatically transitioned to a locked configuration until a forward, unlocking force is applied to the releaser 132 to release the pin 136 from the slot in the slotted portion 146. Thus, once the joints are unlocked and the pin 136 is not aligned with a pair of slots in the slotted portion 146, the ladder 100 can remain in an unlocked configuration until the pin 136 is realigned with a pair of slots in the slotted portion 146 and the pin 136 moves back into those slots. A re-locking force may not need to be applied by the user because the spring 156 can apply that automatic re-locking force as it biases the pin 136 into a locked configuration.

As shown in FIG. 9, the hinge assembly 120 can be configured with at least one locked configuration in which the rear rails 114 are parallel to the front rails 104 and extending vertically above the hinge assembly 120, similar to the configuration of FIG. 2. As with the configuration of FIG. 8, the pin 136 can be released from the slot 150 in this configuration to unlock the hinge 120 and to permit rotation of the second assembly 112 relative to the first assembly 102.

In FIG. 10, the hinge assembly 120 has been reconfigured to a locked configuration with the rear rails 114 substantially parallel to the front rails 104 and extending below the hinge assembly 120, similar to FIG. 3. As with the previous configurations, the pin 136 can be released from the slot 152 to unlock the hinge 120 and to permit rotation of the second assembly 112 relative to the first assembly 102. As shown in FIGS. 9 and 10, the slots 150, 152 can be arranged aligned with each other and with the rotation axis 144. In this manner, the second assembly 112 can be locked in two opposing directions relative to the rotation axis 144 (i.e., in the upward direction of FIG. 9 and in the downward direction of FIG. 10).

Although FIGS. 4-10 show an embodiment wherein three slots (148, 150, 152) are provided in the slotted portion 146, it will be appreciated that in some embodiments, the slotted portion 146 can comprise a larger or smaller number of slots or grooves configured to receive the pin 136 in a manner locking the first assembly 102 at various desired angles relative to the second assembly 112. In some embodiments, in order to make it easier for the user to transition between especially useful configurations (e.g., the configurations of FIGS. 1-3), the number of slots can be limited so that the pin 136 can slide uninterrupted from one preferred slot position to another without needing to consistently apply a force to the releaser 132 along the direction of arrow 164 while the ladder 100 is unlocked and transitioning to a new configuration. Additionally, in some embodiments, only one side of the hinge 120 can comprise a pin and slot interface, so the pin 136 can only engage a slot on one side of the hinge 120.

Figure 12:
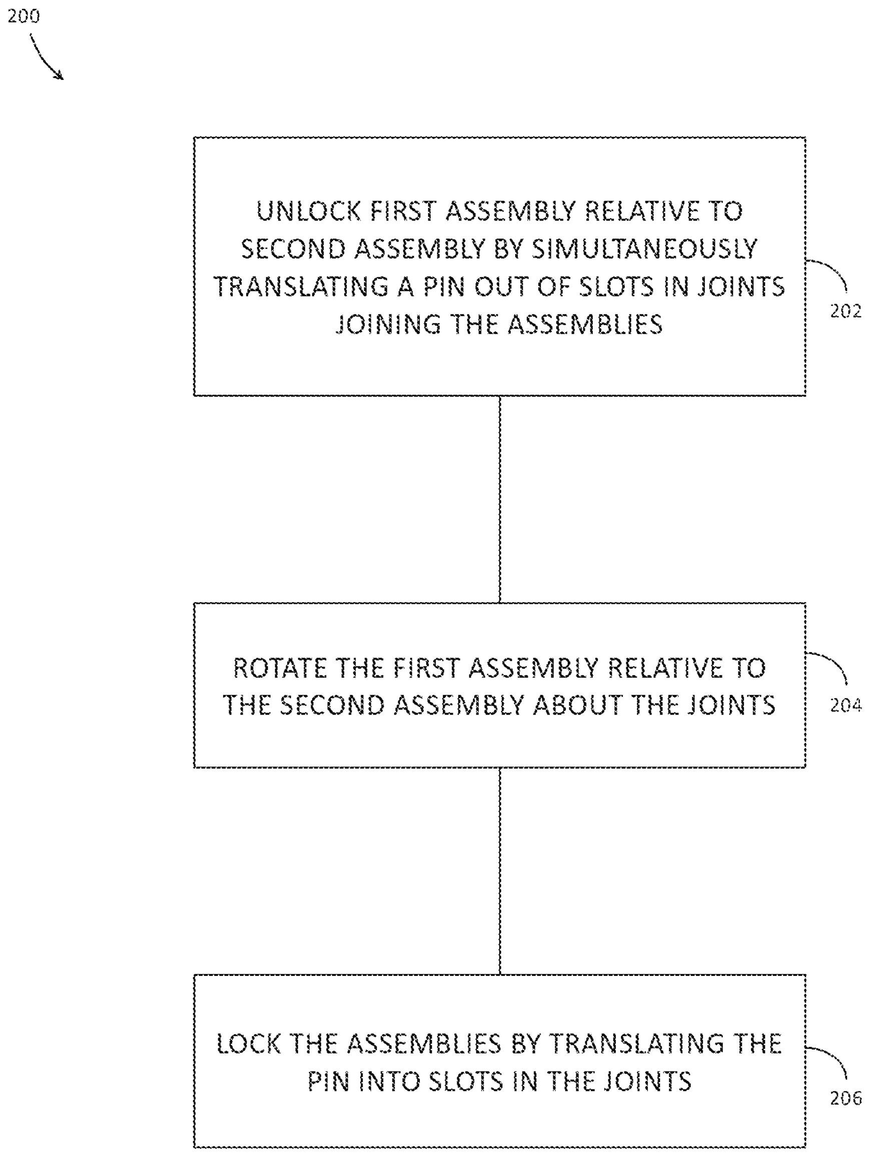
FIG. 12 is a flow diagram showing a method according to an embodiment of the present disclosure.

A plurality of methods and processes are associated with the manufacture and usage of the apparatuses described herein. One example method 200 is shown in connection with FIG. 12. This method 200 can comprise unlocking a first assembly (e.g., 102) of a ladder (e.g., 100) relative to a second assembly (e.g., 112) by simultaneously translating a pin (e.g., 136) out of two slots (e.g., 148, 150, or 152) in two joints (e.g., 122/126 and 124/128) joining the first and second assemblies, as shown in block 202. In the unlocked configuration, the first and second assemblies can be rotated relative to each other about the joints, as indicated in block 204. For example, a rear assembly (e.g., 112) can be rotated relative to a front assembly (e.g., 102) from the position shown in FIG. 1 to a position shown in FIG. 2 or FIG. 3. In some embodiments, the first and second assemblies can be locked by translating the pin into slots in the joints, as indicated in block 206. For example, a pin (e.g., 136) can be translated into slots (e.g., 150 or 152) to lock a hinge assembly (e.g., 120) and the joints of the hinge assembly so that the first assembly of the ladder is rotationally locked relative to the second assembly. In some embodiments, two joints (i.e., one at each end of the pin (e.g., 136)) are simultaneously rotationally locked by the movement of the pin. The movement of the pin can be caused by movement of a rotatable arm or releaser (e.g., 132), and the movement of the pin can be in a direction that is directed radially (i.e., toward or away from the axis of rotation of the joint/hinge). The direction of movement can intersect the rotation axis of the first assembly relative to the second assembly.

Figure 13:
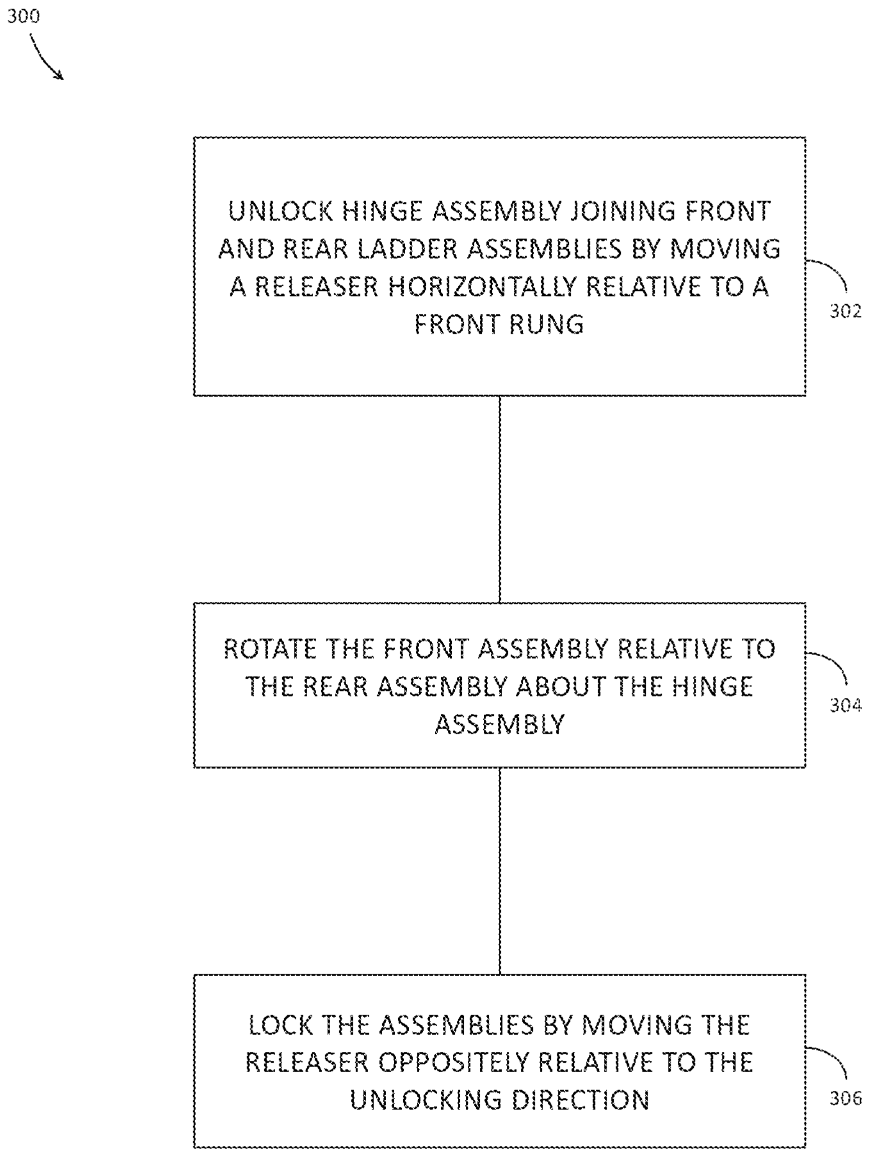
FIG. 13 is a flow diagram showing another method according to an embodiment of the present disclosure.

Another example method 300 is shown in connection with FIG. 13. In this method 300, a hinge assembly (e.g., 120) that joins front and rear ladder assemblies (e.g., 102 and 112) can be unlocked by moving a releaser (e.g., 132) horizontally (i.e., forward or rearward, toward or away from, a front rung (e.g., 106) of the front assembly), as indicated in block 302. In one embodiment, a user may grasp the releaser with their fingers, grasp a portion of the adjacent rung (e.g., 106) with their thumb, and apply a squeezing force in order to actuate or displace the releaser toward the rung and unlock the hinge assembly. The front assembly can then be rotated relative to the rear assembly about the hinge assembly, as indicated in block 304, and as described above and in connection with block 204. In some embodiments, the front and rear assemblies can be locked by moving the releaser in an opposite direction relative to the unlocking direction, as indicated in block 306. For example, if the releaser unlocks the hinge assembly by moving forward, the releaser can lock the hinge assembly by moving rearward. Similarly, rotating the releaser clockwise to unlock can be followed by rotating the releaser counterclockwise to lock. In some embodiments, the releaser can be biased (e.g., by a pin 136 and spring 156) toward a locked configuration or in a direction that tends to lock the hinge assembly. Therefore, the locking of the assemblies by moving the releaser oppositely relative to the unlocking direction can be caused by a biasing force.

The hinge assembly 120 may be used in conjunction with other ladders. For example, a two position ladder (wherein the ladder is configured only to be in the step ladder state (see FIG. 1) or the stored/leaning state (see FIG. 3)). In another example, the hinge assembly 120 may be used in conjunction with an articulating type of ladder. For example, it may be incorporated into a ladder structure such as described by U.S. Pat. No. 9,016,434 entitled LADDERS, LADDER COMPONENTS AND RELATED METHODS, issued on Apr. 28, 2015, the disclosure of which is incorporated by reference herein in its entirety.

Other methods and variations of apparatuses will be apparent in view of the inventive features and descriptions provided herein. While the invention may be susceptible to various modifications and alternative forms, specific embodiments have been shown by way of example in the drawings and have been described in detail herein. However, it should be understood that the invention is not intended to be limited to the particular forms disclosed. Additionally, features, components and elements of one embodiment may be combined with features, components and elements of other embodiments without limitation. The invention includes all modifications, equivalents, and alternatives falling within the spirit and scope of the invention as defined by the following appended claims.

What is claimed is:

1. A ladder comprising:

a first assembly having a first pair of rails and at least one rung positioned between, and coupled to, the first pair of rails;

a second assembly having a second pair of rails;

a hinge assembly joining the first and second assemblies, the hinge assembly including a pair of spaced apart joints, with each joint including:

a first mounting portion;

a second mounting portion pivotable relative to the first mounting portion about an axis of rotation, the second mounting portion having a slot;

the hinge assembly further including a pin extending between each joint of the pair of spaced apart joints, the pin being movable from a first position in the slot of each second mounting portion to a second position out of the slot of each mounting portion, wherein the pin moves toward the at least one rung of the first assembly when displaced to the second position.

2. The ladder of claim 1, further comprising a releaser rotatably attached to the first mounting portion and configured to apply a force to the pin to move the pin from the first position to the second position.

3. The ladder of claim 1, wherein the axis of rotation is a first axis of rotation, wherein releaser pivots about a second axis of rotation, the second axis of rotation being parallel to the first axis of rotation.

4. The ladder of claim 1, further comprising a biasing member positioned and configured to bias the pin into the slot and wherein the biasing member is coupled with the pin.

5. The ladder of claim 1, further comprising a biasing member positioned and configured to bias the pin into the slot and wherein the biasing member is coupled to the at least one rung.

6. A ladder, comprising:

a first assembly;

a second assembly;

a hinge assembly joining the first and second assemblies, the hinge assembly including:

a pair of joints connecting the first assembly and the second assembly, each joint of the pair of joints including:

a first mounting portion coupled with the first assembly; and a second mounting portion coupled with the second assembly, pivotable relative to the first mounting portion about an axis of rotation, and having a slot; and a pin movable from a first position in the slot of each joint of the pair of joints to a second position out of the slot of each joint of the pair of joints, wherein the pin moves radially between the first and second positions relative to the axis of rotation.

* * * * *